May 2, 1967  A. VAN GELDER  3,316,652
CONTINUOUS DEHYDRATING PROCESS
Filed Oct. 24, 1965  2 Sheets-Sheet 2
FIG_4
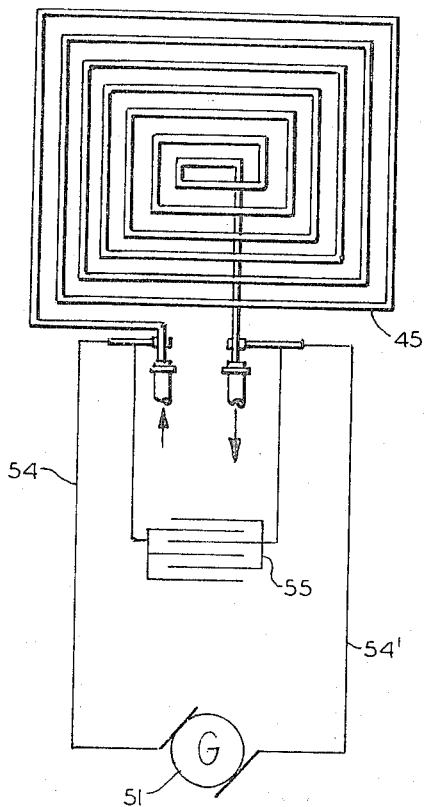
FIG_3
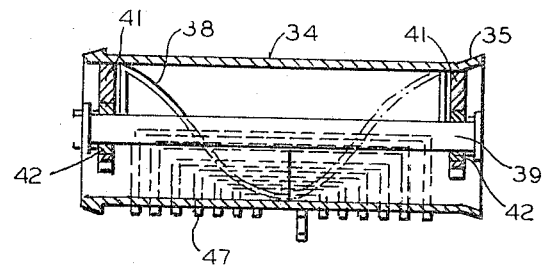
FIG_2
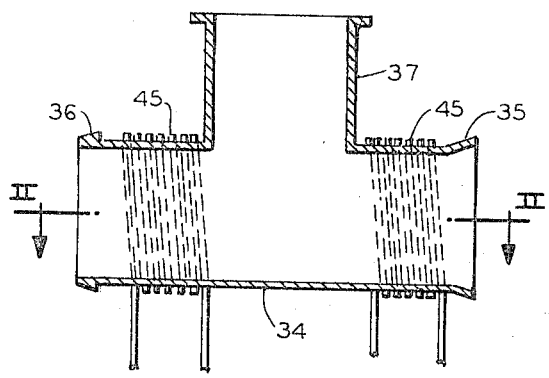
INVENTOR.
ARTHUR van GELDER
BY United States Patent Office 3,316,652
Patented May 2, 1967

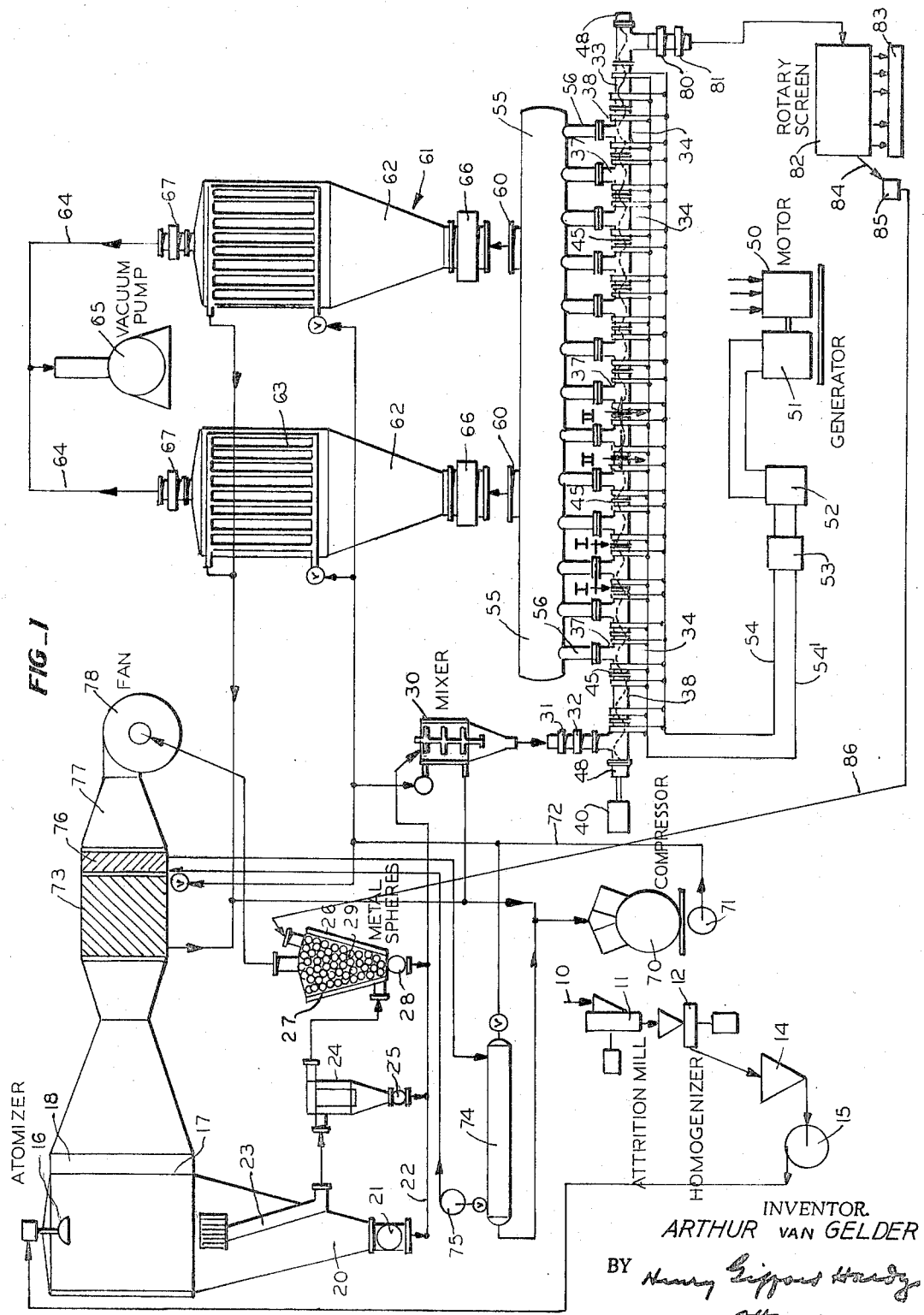

3,316,652
CONTINUOUS DEHYDRATING PROCESS
Arthur van Gelder, Ojai, Calif., assignor to Sun-Freeze, Inc., Ojai, Calif., a corporation of California
Filed Oct. 24, 1965, Ser. No. 504,800
6 Claims. (Cl. 34—5)

This invention relates to freeze vacuum dehydrating but more specifically to the continuous dehydration process using induction heating.

The process of the present invention has particular application in the dehydration of fruit juices and other liquids containing suspended or colloidal solids, whereby the liquid is reduced to a dried powder-like product which may be easily stored or shipped, and which may be quickly reconstituted with cold or hot water to provide the properties and characteristics of the original liquid source.

It is an object of the present invention to provide a process for the freeze vacuum drying of solutions, colloidal suspensions and pulps, whereby the freeze vacuum drying is performed continuously more economically and at a higher rate of output than prior processes.

A further object of the present invention is to provide a continuous process for producing a dehydrated product in the form of dried powder or small particles which have substantially the same properties and characteristics as the original product, after reconstitution with cold or hot water.

A further object of the present invention is to provide a process which operates in a continuous manner so that the operating conditions may be automatically controlled.

A still further object of the present invention is to provide a continuous process for the dehydration of products at a greatly increased dehydration rate over prior processes, to provide an end product having a low bulk density.

Yet another object of the present invention is to provide a continuous process for the dehydration of products, such as solutions, colloidal suspensions, and pulps, whereby the product is frozen prior to dehydration to provide a porous end product which is easily reconstituted in cold or hot water.

Another object of the present invention is to provide a continuous freeze vacuum drying process for the dehydration of any solution, colloidal suspension or pulp, by means of sublimation at low pressures under the influence of induction heating.

It is a still further object of the present invention to provide a substantially continuous process for the freeze vacuum drying of a product wherein the product is divided into small particles and frozen in the form of a dried powder in order to present a very large surface area of the production for the application of an induction heated medium thereto; also to present a very large surface area in close and intimate contact with the product to thereby provide a process having a greatly increased rate of dehydration over that of prior processes.

It is a further object of the present invention to convey the product during dehydration in such a manner as to change and expose new surface areas of the product to the induction heated medium continuously, thereby substantially increasing the dehydration rate and improving the quality of the product.

Another object of the present invention is to provide a process which employs familiar techniques similar to those of freeze vacuum drying but where the dehydration is accomplished by continuously applying an induction heating medium in close contact with the product, thus providing an increased evaporation rate and improving the conditions for cleaning of the equipment far beyond anything in the known methods.

A still further object of this invention is to provide a process for the simple dehydration of liquids containing suspended or colloidal solids or pulps under low pressures and under the influence of induction heating which lends itself on a continuous basis to precisely controlled automation, thereby obtaining a product of any desired solids concentration.

A further object of this invention is to provide a process inducing a greatly increased rate of low temperature evaporation from liquids containing suspended solid particles by continuously maintaining these liquids and particles in intimate and close contact with an induction heated medium having a very large surface area and doing this in a low pressure environment thereby permitting a dehydrated product which upon reconstitution is not materially unlike the original substance from which the dehydration product was derived.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts and steps illustrated in the accompanying drawings, and while there is shown therein a preferred embodiment, it is to be understood that the same is illustrative of the invention and that the invention is capable of modification and change and comprehends other details of construction and steps without departing from the spirit thereof or the scope of the appended claims.

In the drawings:

FIGURE 1 is a schematic diagram showing the apparatus and flow diagram for carrying out the steps of the process;

FIGURE 2 is a vertical sectional view on an enlarged scale along the longitudinal vertical plane I—I in FIGURE 1, illustrating a T-segment of the vacuum apparatus with the induction coils in position;

FIGURE 3 is a sectional view on an enlarged scale along plane II—II of a segment of the vacuum apparatus but having a variant form of the induction coil and illustrating the internal helicoidal conveyor and its coupling; and FIGURE 4 is a schematic diagram of a variant induction coil such as that shown in FIGURE 3, but removed from the vacuum apparatus.

The present invention provides a process and apparatus for the dehydration of products such as solutions, suspensions, colloidal suspensions and pulps of any kind, by subjecting such products to a series of steps to transform the same into a dried powder-like end product which can be reconstituted with either hot or cold water into a form having substantially the same properties and characteristics as the original product. For example, if the product to be dehydrated is orange juice, the dried powder would be reconstituted with cold water in order to provide a mixture having substantially the same taste, coloring, texture, enzyme and vitamin content as the original orange juice.

Referring now to FIGURE 1 of the drawings in which like reference numerals indicate like parts in the several views, there is shown a flow diagram with the apparatus for carrying out the steps of the process. Initially it is desirable to prepare the product for treatment and bring it into a state of solution, suspension or colloidal suspension consisting of finely divided solids and liquids. The product used here for illustrating and describing the invention is orange juice and the juice is prepared in any conventional manner such as squeezing. The juice 10 with its natural pulp is fed into an attrition mill 11 where the solids, whether in suspension or solution, are reduced to finely divided form. The juice with its finely comminuted solids is then fed into an homogenizer or colloid mill 12 for further preparation where it is converted to a suspension which flows into a holding tank 14. Preftrably the holding tank, if circumstances require, is cooled by refrigeration.

From tank 14 it is pumped by a proportioning pump 15 to an atomizer or spray nozzle 16. The atomizer or spray nozzle 16 may be stationary or rotating and of any suitable size as is conventional in this art. The controlled flow from the proportioning pump 15 is necessary in order to feed the material at a rate so that it freezes instantly upon atomization. The atomizer 16 is preferably a high speed rotary atomizer capable of dividing the fluid into small particles. It is located within a cylindrical vessel or chamber 17 which is cooled internally by a flow of cold air or other gas, tangentially introduced at 18 to cause a spirally rotating pattern within the chamber 17. The gas introduced is pre-cooled well below 0° F. by apparatus which will hereinafter be described, so that the atomized small particles of the product are instantaneously frozen upon contact with the cold gas. Any method of quick freezing of these particles is entirely satisfactory and it should be noted that generally, the quicker the freezing process the better the final product. Atomization of the homogenized material is not necessary as any means for reducing it to a frozen powder or snow-like product is quite satisfactory for the performance of this step.

The frozen particles spiral downwardly by gravity into the conically shaped bottom portion 20 of the chamber 17. From here they are continuously discharged through an air lock device or star valve 21 into the line 22. The cold air or other gas is discharged from the chamber 17 by means of a duct 23 which is connected to a separator 24 where any entrained or remaining particles of the frozen product are separated from the cold gas. The collected frozen particles are removed from the separator 24 by means of a star valve 25 at the bottom of the separator and pass into the main line of flow 22. The cold air discharged from the separator 24 is delivered to another chamber 26 which is made with a perforated spaced inner jacket 27 of substantially the same shape and slope as the outer shell of the chamber 26. Within the perforated jacket 27 are pellets made of a suitable conducting material such as metal, carbon, graphite and the like, and preferably in a form of spheres or balls 29, although other geometric shapes which provide a substantial surface area may be used. Regardless of the shape, it is preferable to coat such conducting spheres or balls 29 with a suitable plastic material such as Teflon in order to prevent any possible contamination to the product and to prevent the product from sticking to the pellets themselves. The pellets may be solid or hollow but are shown in the drawings as spheres as a matter of convenient reference. The spheres 29 are cooled in the chamber 26 by the cold gas from the separator 24 so that they attain a temperature below the freezing point of the frozen particles which are in the line 22. This is so that when the spheres 29 contact the particles in the line the particles themselves will not melt upon the contact.

A pre-determined quantity of the spheres 29 is measured out of the chamber 26 through the valve 28 and into the line 22 so that they are delivered together with the frozen particles to the mixer 30. The mixer 30 is cooled likewise to a temperature below the freezing point of the particles to maintain their frozen state. It is also under continuous agitation with the spheres 29 to maintain a uniform proportion between the spheres and the particles and to maintain the particles in a frozen state.

The spheres 29 are used for the purpose of obtaining a large surface area in direct contact with the frozen particles being processed. For example, when the pellets or spheres are one-half inch in diameter and arranged side by side in layers, one cubic foot of these would represent a total surface area of 75.36 square feet. The interstices available for the product would represent some 46% of the same cubic foot occupied by the spheres. Should the ratio be changed so that 60% of the cubic foot would be occupied by the product then the possible surface area of the spheres for contact with the product would be 64.81 square feet. Thus, it is plain that by changing the proportion of the spheres per cubic foot, it is possible to mathematically change the surface area available for contact with the frozen particles. The maximum surface area of spheres for the maximum volume of frozen particles, i.e., not less than 60%, is the operating requirement for this process.

The frozen particles and the spheres 29 in proportion from the mixer are discharged into the vacuum apparatus through two air locking systems 31 and 32 which are preferably butterfly valves or slide valves. The upper or first air lock 31 operates in sequence with the second air lock 32. As air lock 31 opens dropping the frozen particles and pellets into the small chamber while the second air lock 32 remains closed, air lock 31 then closes and second air lock 32 opens to allow the product and the pellets to pass into the vacuum chamber 33 in which a high vacuum is maintained.

The vacuum chamber 33 is preferably a long tube which may be placed either horizontally or vertically, but preferably in the horizontal position. It is made up of a succession of T-shaped segments 34 made of glass or any other suitable dielectric material. As shown in FIGURE 2 the cylindrical segments are T-shaped with a radial vent or take-off pipe 37. These segments are removably joined at 35 and 36 in a linear series with couplings (not shown) to provide air and bubble-tight seals preserving the vacuum within the chamber 33 while at the same time providing a means for quick access for disassembly of any of the T-sections 34 for purposes of cleaning or replacement as needed. The tube, of course, is sealed at both ends by caps 48. The radial vent 37 is of sufficient cross-sectional area to allow all evaporative products to escape from the chamber 33 at the lowest practical velocity and with the minimum turbulence. Inside the segmented lengths of the chamber 33 there is means for continuously conveying the product being processed and the mixed spheres through the length of the chamber. As shown in FIGURE 3, a helical screw conveyor 38 is preferably made in sections corresponding with the segments 34, and driven by a connecting common shaft 39 by a suitable drive mechanism 40. As shown by FIGURE 3, the segmented shaft 39 is supported in each segment 34 by suitable spiders 41 with oilless bearings 42. Each screw section 38 is removably joined in a continuous helicoidal pattern to each other screw section by means of any suitable coupling. The helical or screw type conveyor has the advantage of continuously causing the spheres 29 to rotate or tumble and move while still contacting the material under treatment, so that as the mixture is moved through the chamber 33 new surface areas of the material are continuously exposed to the particles. The conveyor means, regardless of type, however, is preferably formed of a dielectric substance including suitable plastics and the like when the strength requirements permit. The drive mechanism 40 is a variable speed drive so as to permit control of the speed of conveying the mixture through the chamber 33.

Chamber segments 34 have induction heating means surrounding the same in the form of coils 45 which are wrapped around the exterior thereof as shown in FIGURES 1 and 2. As shown in FIGURE 3 the induction heating means may be a pancake coil 47 wrapped around only a portion of the segments 34. The coils 45 and 47 may be tubular so as to permit the circulation of a coolant therethrough in order to maintain the coils at a constant temperature with the desired constant electrical resistance, allowing large currents to pass through the relatively small coils without undue heating. Oscillating electrical current is passed through the electrical conducting coil means 45 and 47 by means of a transformer at controlled frequencies. The frequency may be at line frequency or higher by means of electrical generators with frequencies up to 20,000 cycles per second, or by means of radio-frequency generators to about 1 megacycle per second (1,000,000 cycles per second). The heat to the system may be controlled manually or automatically by variations in the vacuum pressure or product temperature within the chamber 33. To supply the required current motor 50 is provided which drives generator 51. Although the coils 45 are shown electrically connected by lines 54 and 54′ in parallel, they may also be connected in series as this is dependent upon the particular application involved. Referring to FIGURE 4, a capacitor 55 may be used to obtain maximum power efficiency in the coils by equalizing the capacitative reactions with inductive resistance so as to maintain the coil means in resonance with the generator systems. Capacitor 55 may be installed for each individual coil 45 as shown in FIGURE 4 or with several coils in a group with one or more capacitors 55 across the lines 54 and 54′ in suitable locations. These capacitors may be fixed, variable, or both, and the variable capacitors may be made to automatically control the resonance to accommodate a variable generator load by suitable motorization.

As the frozen product particles and spheres pass through the vacuumized tube 33 the spheres 29 are subjected to the variable electromagnetic forces emanating from the induction coils 45. The emitted energy passes through the dielectric walls of the chamber segments 34 inducing secondary eddy currents in the spheres 29 which causes them to heat. This heat is transferred through the close contact by conduction and radiation to the frozen particles of material as they are being carried along in continuous contact with the spheres through the vacuumized chamber 33. The vacuum causes the boiling point of the product to be lowered by decreasing the vapor pressure. To keep the product frozen the vacuum pressure must equal the saturated vapor pressure of the product below its freezing point. It is therefore desirable that the vacuum pressure be as low as possible commensurate with economy of operation. The application of heat to the frozen produce under vacuum causes the product to boil or lose its moisture by sublimation.

The very large surface of heating area provided by the spheres 29 in the intimate contact with the large surface area of the particles enables a large amount of heat to be absorbed by the particles in a very short time producing a rapid and efficient dehydration which is even further enhanced by the agitation produced during passage of the mixture through the chamber 33.

The vapors and moisture from the dehydration from within the chamber 33 pass through the ducts 37 and their air and bubble-tight connection with the corresponding manifold radial members 56, into the manifold 55. The manifold has a sufficient cross-sectional area to maintain the velocity of the vapor at a reasonable level. From the manifold they pass through the large ducts 60 into the condenser system 61 through the operation of the vacuum pump 65. The water vapor is relieved of its moisture in the condenser system by precipitation and frost formation on the refrigerator coils or plates 63. The condenser coils or plates 63 have a surface temperature below that of the dew point temperature of the product caused by the vacuum pressure. For example, at a pressure of 100 microns of mercury the saturated temperature of water ice will be approximately −40° F. and the coil temperature should be below −40° F. and preferably at least 15° F. lower, namely, −55° F. The condenser system 61 is connected to a vacuum system by lines 54 which lead to the vacuum pump 65. The condenser system is used to precipitate the moisture coming from the vapor before entering the pump because, for example, one pound of water vapor at 100 microns of mercury vacuum occupies approximately 140,000 cubic feet and a very large pump would be required to move this amount of vapor. To make this process continuous, two or more condenser systems 61 are operated in parallel, one being in operation while the other is being defrosted from the ice precipitation on the refrigerated coils or plates 63 caused by the moisture coming from the vapor. To accomplish the isolation of the condenser from the vacuum system while it is being defrosted, each condenser is isolated from the manifold 55 and the pump 65 by two valves 66 and 67. These are preferably butterfly valves or slide valves. It is apparent that suitable control means are provided to control the temperature of the refrigerated coils or plates 63, to stop the flow of refrigerant to the coils, to switch on the defrosting device operated by means of electricity and to close and open the valves 66 and 67. It is further aparent that conventional control means may be used so that one or more of the condensing systems is in operation while one or more are being defrosted. While one type of condensing system is shown, it is to be understood that any suitable system for removing the moisture vapors may be used in connection with this process so long as it is available for operation on a continuous basis.

The refrigeration for the system is supplied by a compressor 70 operably connected to a refrigeration condenser 71 which is cooled either by air, water or evaporation. The refrigerant is circulated directly through line 72 with suitable valving to the condenser coils or plates 63, to the mixer 30, and to the refrigeration coils 73. The refrigerant is also circulated through a heat exchanger 74 through appropriate valving. The brine in the heat exchanger is pumped by pump 75 to the condenser 76 in the cooling chamber 77. The cold air or gases supplied to the freezing chamber 17 is cooled by means of one or more refrigerating coils 73 in the cooling chamber 77 which is maintained at a temperature well below the freezing point. The secondary refrigerated coil 76 is maintained at a temperature just above freezing to remove excess moisture from the air or gas which would otherwise accumulate in considerable quantity on the freezing coil 73. A fan 78 provides the required volume and pressure of air and gas and has its outlet operably connected to the chamber 77. Its inlet end is operably connected to the chamber 26 thereby making the entire cooling system one continuous unit The final steps in the process include the releasing of the dehydrated particles and spheres from the vacuumized tube 33 through air locks 80 and 81 which operate sequentially in the same fashion as the admitting air locks 31 and 32. The dehydrated particles at room temperature and atmospheric pressure are separated from the spheres 29 in the rotary screen 82 or in any other suitable manner. The dehydrated product is delivered to means 83 for conveying it to other stations for packaging and storage. The spheres are recovered from the rotary screen by line 84 and are cleaned in any suitable manner at 85. The cleaned spheres are then returned to line 86 to the perforated container 27 in chamber 26 for continuous recycling through the system.

It will thus be appreciated that the process is completely continuous as the frozen particles and spheres are continuously conveyed through the vacuumized tube and continuously subjected to the electromagnetic forces producing induction heating in the spheres and the heat is continuously being transferred to the frozen particles by means of conduction and radiation while the particles and spheres are progressing through the vacuum chamber or tube 33. While in the tube the product is undergoing dehydrating and releasing its moisture in the form of vapor which is continuously withdrawn from the chamber causing the product to dehydrate continuously to a dry powder-like substance which is then continuously discharged through suitable air locks. It will further be appreciated that the entire process through suitable control devices, sequencing, time cycles and other means well-known to the art, can be completely automated thereby reducing greatly the cost of production and therefore produce a product which, although finer in quality, is more economical to produce than by any other process heretofore used.

It has been noted that evaporative freezing may effectively be accomplished for products having not more than twenty to twenty-five percent solids by introducing them in liquid form into the vacuum chamber 33 along with the appropriate number of pre-cooled spheres 29. Under these circumstances the liquid flashes into snow immediately and is in the proper form of minute frozen particles for the dehydration and finishing previously described. Not only does an immediate freezing take place, but also a large amount of evaporation is accomplished before the product reaches its dew point. It will be observed that this short cuts a great amount of equipment and several steps which further reduces the cost of the end product.

This invention is copending and a companion to an earlier filed application Serial No. 241,921 filed Dec. 3, 1962, which issued May 31, 1966, as Patent No. 3,253,344.

I claim:

1. The continuous method of dehydration of liquids and liquids containing suspended or colloidal solids comprising the steps of reducing the solids in the liquid to finely divided form, instantly freezing said material to produce a powder of frozen particles, mixing the frozen particles under continuous agitation with a pre-determined volume of electrically conductive pellets which have previously been cooled to a temperature below the freezing point of said powder, moving said powder proportioned with said pellets in continuous tumbling engagement through a vacuum chamber in the presence of induction heating thereby raising the vapor pressure of said powder above the negative pressure causing dehydration of said powder, continuously separating the dehydrated powder from the pellets and continuously returning the pellets to the system.

2. The method of claim 1 wherein said pellets are Teflon coated spheres to prevent damage and contamination to said powdery composition while moving through the process equipment.

3. The method of claim 1 wherein said pellets are Teflon coated graphite, electrically conductive material for induction heating in geometric shapes.

4. The method of dehydrating liquids having less than 25% colloidal or suspended solids comprising the steps of introducing said liquid into a high vacuum admixed with plastic coated electrically conductive pellets having previously been cooled to a temperature below the freezing point of said liquid in the proportion so that not less than 60% of the available surface area of said pellets is available for contact to instantaneously reduce said liquid to frozen particles, moving said frozen particles and pellets in rolling contact through the vacuum chamber to dehydrate the frozen particles and produce a dry powder, removing the dry powder and pellets and separating the same from each other at normal temperatures and pressures, and continuously returning said pellets to the system.

5. The continuous method of dehydrating a frozen and powdery product comprising the steps of mixing the finely divided frozen product with a heating medium having an available contact surface area of not less than 60% and which has been cooled to a temperature below the freezing point of said product and moving said mixture through a vacuum chamber in rolling contact while the medium is heated by induction to dehydrate the same, separating the dehydrated product from the heating medium at atmospheric pressure and temperature, and continuously returning the heating medium to the system for reuse.

6. In the continuous method of dehydrating liquid products having suspended or colloidal solids, the steps of reducing the liquid and suspended solids to finely divided form, instantaneously freezing the same to form minute ice crystals or snow, moving said snow with a heating medium of Teflon coated pellets in proportion so that not less than 60% of their surface is available for contact with said snow while maintaining the frozen state of said snow, moving said mixture in rolling engagement through a vacuum chamber while subjecting said heating medium to induction currents to heat the same and dehydrate said snow, separating the dehydrated material from the heating medium at normal temperature and pressure, returning the heating medium to the system and packaging the dehydrated product.

References Cited by the Examiner

UNITED STATES PATENTS

| | | | |
|---|---|---|---|
| 1,701,156 | 2/1929 | Heritage | 34—1 |
| 2,388,917 | 11/1945 | Hormel | 34—5 |
| 2,552,360 | 5/1951 | Zichis | 34—5 |
| 2,841,339 | 7/1958 | Gilmore | 34—5 |
| 3,024,117 | 3/1962 | Barlow | 62—74 |
| 3,048,928 | 8/1962 | Copson | 34—1 |
| 3,253,344 | 5/1966 | Van Gelder | 34—5 |

WILLIAM J. WYE, *Primary Examiner.*